(12) United States Patent
Jankowiak (10) Patent No.: US 6,313,878 B1
(45) Date of Patent: Nov. 6, 2001

(54) METHOD AND STRUCTURE FOR PROVIDING AN AUTOMATIC HARDWARE-IMPLEMENTED SCREEN-SAVER FUNCTION TO A DISPLAY PRODUCT

(75) Inventor: Patrick Joseph Jankowiak, Dallas, TX (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/196,904

(22) Filed: Nov. 20, 1998

(51) Int. Cl.[7] .............. H04N 5/68; H04N 9/22; H04N 9/27; G09G 5/00; G09G 1/28
(52) U.S. Cl. .......... 348/377; 348/377; 348/378; 348/379; 348/380; 348/381; 348/382; 345/112; 345/146; 345/173; 345/212; 315/383; 315/403; 315/368.17
(58) Field of Search ................ 348/377–382, 348/805; 345/112, 146, 212, 173; 315/368.17, 383, 403

(56) References Cited

U.S. PATENT DOCUMENTS

| | | | |
|---|---|---|---|
| 4,338,623 | * 7/1982 | Asmus et al. | 358/22 |
| 4,549,217 | * 10/1985 | Sendelweck | 358/243 |
| 4,670,784 | * 6/1987 | Goldberg | 358/141 |
| 4,722,005 | * 1/1988 | Ledenbach | 358/168 |
| 5,448,262 | * 9/1995 | Lee et al. | 345/212 |
| 5,648,794 | * 7/1997 | Jelsma et al. | 345/98 |
| 5,714,842 | * 2/1998 | Krause et al. | 348/380 |
| 5,796,945 | * 8/1998 | Tarabella | 395/200.9 |
| 5,880,719 | * 3/1999 | Kikinis | 345/212 |
| 6,008,842 | * 12/1999 | Nagata | 348/173 |

* cited by examiner

Primary Examiner—Reinhard J. Eisenzopf
Assistant Examiner—Paulos M. Natnael
(74) Attorney, Agent, or Firm—Reneé Michelle Larson (57) ABSTRACT

A hardware-implemented screen-saver prevents burn-in of an image displayed on a screen of a display product by automatically reducing the video gain, and therefore the contrast, of the image when the portion of the image within a two-dimensional detection window has changed by less than a predetermined amount for a predetermined period of time. A lack of change of the incoming video signal of the image is detected and used to invoke a reduction in contrast of the image displayed on the display product. This allows the image to remain visible, yet reduces the possibility of burn-in of the image in the screen of the display product.

29 Claims, 5 Drawing Sheets

METHOD AND STRUCTURE FOR PROVIDING AN AUTOMATIC HARDWARE-IMPLEMENTED SCREEN-SAVER FUNCTION TO A DISPLAY PRODUCT

FIELD OF THE INVENTION

This invention relates generally to display products, such as monitors, screens, and projectors, and more particularly to an improved screen-saver for display products.

BACKGROUND OF THE INVENTION

Some form of display products is used in just about every imaginable field of human endeavor. Any application in which information of some form or another is to be conveyed will most probably use one or more display products to convey that information. Display products, which include screens, monitors, such as computer and video monitors, and projectors, are indispensable to engineering, scientific, educational, government, military, and entertainment endeavors.

A common problem with displays is that an image will burn into the display after the image has been static or unchanging for a long period of time. Cathode ray tube (CRT), plasma, and liquid crystal display (LCD) displays are well known examples of display products that are susceptible to the burn-in problem. Of course, the longer a static image is displayed, the greater the probability that burn-in will result. Burn-in of the image results in an objectionable pattern that becomes visible when the product display changes to another image. Burn-in of an image in expensive display products, such as costly video monitors and projectors, is of particular concern. For example, in cases where large numbers of video communications links are continuously monitored, it is common that one or more display products will brightly display the same, unchanging image, such as logos, test patterns, or color bars, for long periods of time.

The display burn-in problem has typically been addressed with so-called "screen-saver" software, especially in the realm of computer screens. Screen-saver software detects a lack of input from the user interface and, after a predetermined time, usually set by the user, the software will invoke screen-saving activity that prevents burning of the image in the display product. The use of such screen-saving software is well known in the field and is available both commercially and at no charge.

While the software screen-savers commonly used for inexpensive display products, such as computer monitors, operate to prevent burning of the image into the display, they by definition do not permit the image to been seen on the display product once invoked. There are many applications, particularly where expensive display products are used, where it is desirable for the image to be continuously displayed on a display product. High-end video monitors and screens, for instance, are used to display advertisements that do not change for long periods of time in high visibility areas like airports and shopping malls. Where advertisers pay top dollar in order to purchase such prime advertising locations, the advertising image must be continuously displayed. A display product in which a company logo has been burned into the display often must have its CRT replaced, even though the display product may otherwise be functioning properly. Or, consider a broadcast monitor used in a security office of a jail or a secured military environment that must display the image of a remote location under surveillance for indefinite periods of time. In all of these applications, the image must be shown indefinitely regardless of the possibility of image burn-in.

In light of the above discussion, it is clear that there exists a need in the art to be able to indefinitely display an image on a display product while preventing burn-in of the image.

SUMMARY OF THE INVENTION

It is accordingly an object of the invention to be able to indefinitely display a static image on a display product while preventing burn-in of the image into a screen of the display product.

Therefore, according to the present invention, a method and system automatically provides a screen-saver function to a display product that burn-in of an image displayed on a screen of the display product by automatically reducing the video gain, and therefore the contrast, of the image when a part of the image within a two-dimensional detection window has changed by less than a predetermined amount for a predetermined period of time. The contrast of the image is restored once the content of the detection window changes at least the predetermined amount. The screen-saver of the present invention allows the image to remain visible, yet reduces the possibility of burn-in of the image in the screen of the display product.

The method of the present invention adjusts of the contrast of the image within the detection window by performing the following: defining a size and a position of the detection window of the image, detecting when a predetermined amount of the image within the detection window has not changed for the predetermined period of time, and in response to the image being static, reducing the contrast of the entire image displayed on the display product screen.

This method may be implemented by first, second, or third embodiments of the present invention. According to the first embodiment of the invention, a sampling circuit receives channel signals, representative of the red, green, and blue component signals of the video signal provided to the display product, and first and second control signals generated by a timer and logic circuit. The sampling circuit monitors the channel signals and generates a sampling signal indicative of whether the predetermined amount of any of the channel signals has not changed for the predetermined period of time within the detection window. The timer and logic circuit receives the sampling signal, a horizontal sync signal, and a vertical sync signal and generates first and second control signals and an adjustment signal capable of reducing the contrast of the static image within the detection window when the predetermined amount of any of the channel signals has not changed for the predetermined period of time. A gain control element receives the channel signals and the adjustment signal generated by the timer and logic circuit and changes the gain of the channel signals if controlled to do so by the adjustment signal. The image represented by the channel signals is displayed on a screen of the display product with reduced contrast so long as the image remains unchanging by the predetermined amount. Once the image is no longer static, the adjustment signal causes the contrast of the image to return to the nominal, pre-static state. The second embodiment of the present invention operates in a similar manner as the first embodiment, but is simplified for a monochromatic video display and so only has one channel signal, rather than three RGB channel analog signals.

According to the third embodiment of the present invention, the gain of a static video signal displayed on a digital display device, such as an LCD or plasma display panel, is reduced. This embodiment works in similar fashion to the first embodiment except that instead of sampling an analog signal in a sampling window, a checksum algorithm a processing block is used to determine when the video signal has not changed by the predetermined amount for the predetermined period of time.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention prevents burn-in of an image displayed on a screen of a display product by automatically reducing the video gain, and therefore the contrast, of the image when the image within a two-dimensional detection window has changed by less than a predetermined amount for a predetermined period of time, i.e. become static. A lack of change of the incoming video signal of the image is detected and used to invoke a reduction in contrast of the image displayed on the display product. This allows the image to remain visible, yet reduces the possibility of burn-in of the image in the screen of the display product. The improved hardware-implemented screen-saver of the present invention is a preferable solution over software-based screen-savers in environments in which the image must be displayed for indefinite periods of time, as is often the case with expensive display products. The present invention, however, is applicable to any display product, including, but not limited to, monitors, such as computer and video monitors, screens, and projectors.

The term "hardware-implemented screen-saver" as used in the present invention is meant to encompass any means by which the video gain and thus the contrast of a video image displayed on a display product can be reduced and, hopefully, eliminated. To this end, actual hardware, as will be described herein, firmware, software, or any combination therein, that accomplishes the functionality of reducing the video gain of the input video signal to a display product may be employed and be in keeping with the spirit and scope of the invention.

Figure 1:
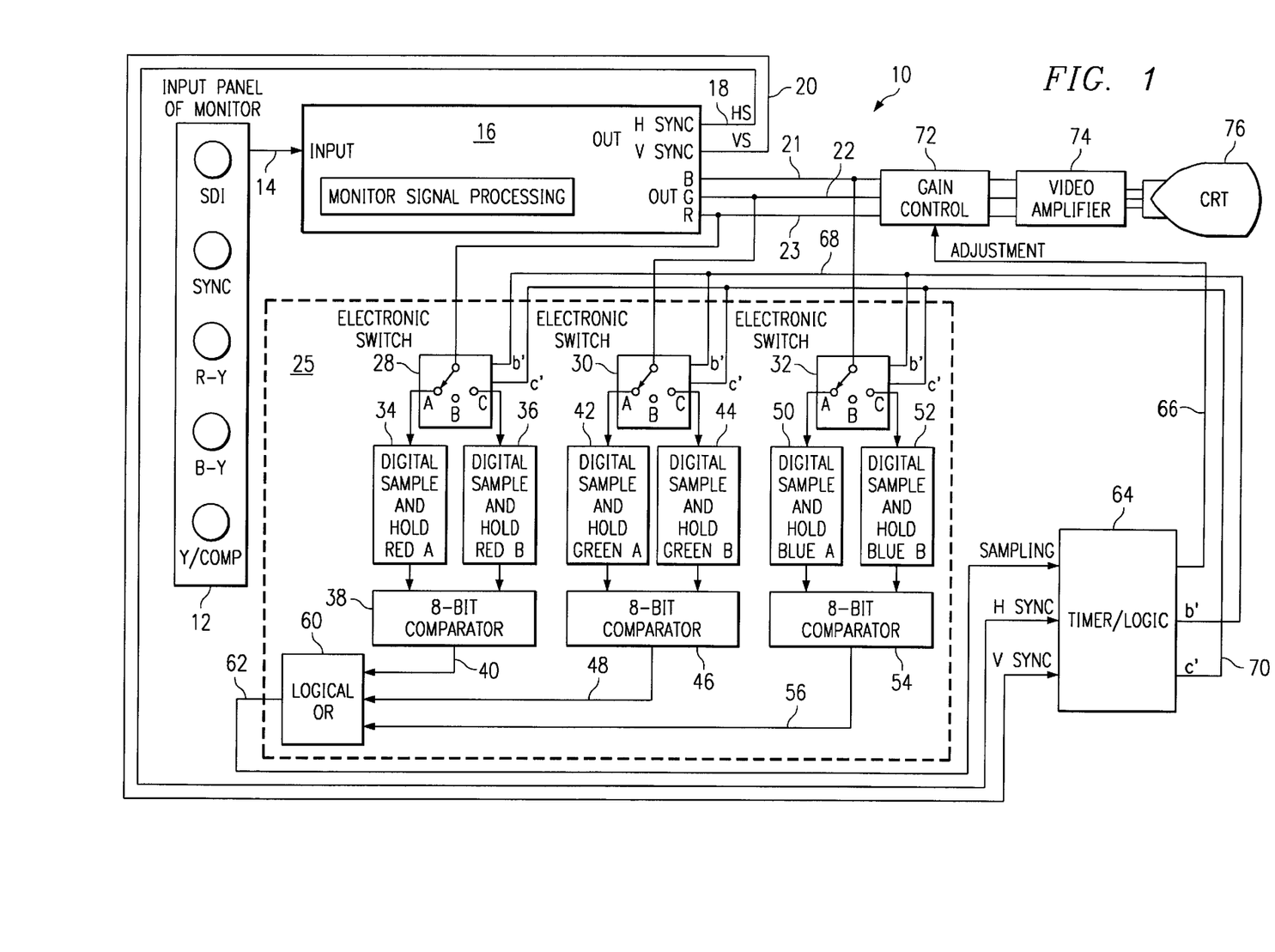
FIG. 1 is a block diagram of a RGB CRT analog display product, according to a first embodiment of the present invention.

Referring now to FIG. 1, a block diagram of a display product 10 that includes a screen-saver to reduce the contrast of an RGB analog image displayed on a screen of the display product in response to a certain portion of the image being static for a predetermined period of time is shown. For purposes of example, the display product is a display monitor having a CRT screen. A projector, screen, or other display product may also use the invention described in the following text and accompanying figures. The display product 10 may be used with a wide range of interlaced and non-interlaced horizontal and vertical sweep frequencies. For purposes of example, the well-known NTSC (National Television Standards Committee) sweep frequencies of approximately 15.75 kHz horizontal and approximately 59.9 Hz vertical with an interlaced frame signal are assumed. The invention may readily be used with other sweep frequencies and with a non-interfaced frame signal.

Display product 10 has the following elements: an input panel of the display monitor 12 to which a video signal is provided to the monitor, a signal processing block 16 that is provided with the video signal 14, sampling circuitry 25 that includes electronic switches 28, 30, and 32, sampling circuits 34, 36, 42, 44, 50, and 52, comparators 38, 46, and 54, and logic element 60, timer/logic circuit 64, gain control 72, video amplifier 74, and CRT screen 76.

A video signal of any type is provided to the monitor at input panel 12 which in turn provides video signal 14 to signal processing block 16. Signal processing block 16 processes video signal 14 to produce several output signals: horizontal sync signal 18, vertical sync signal 20, blue channel signal 21, green channel signal 22, and red channel signal 23. Color channel signals 21, 22, and 23 are received and used by CRT screen 76 to display the image contained within video signal 14.

Prior to the color channel signals being provided to the CRT screen 76, the signals must be sampled in order to determine whether a predetermined amount of the image displayed on CRT screen 76 has been static, or unchanging, for a selected predetermined period of time, such as 10 minutes. Sampling circuitry 25 samples color channel signals 21, 22, 23 and generates a sampling signal 62 that causes gain control 72 to reduce the gain of color channel signals 21, 22, 23 when video signal 14 has become static (unchanging) for some period of time or to restore the gain of color channel signals 21, 22, 23 when a previously static image is no longer static. Reducing the gain of the color signals causes the contrast of the image displayed by CRT screen 76 to be reduced, thereby preventing burn-in of the image into the screen.

Figure 2:
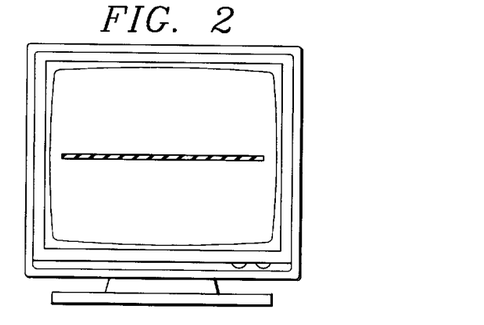
FIG. 2 illustrates a one-dimensional detection time window encapsulated within a horizontal line of a screen of a display product, according to the present invention.
Figure 3:
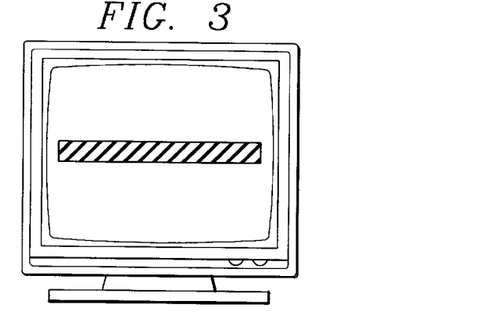
FIG. 3 illustrates a two-dimensional detection time window comprised of multiple one-dimensional time windows of the type shown in FIG. 2 contained within a screen of a display product, according to the present invention.
Figure 4:
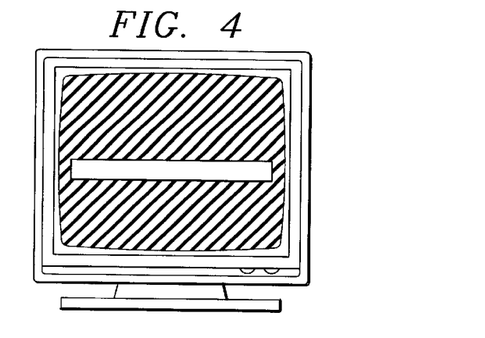
FIG. 4 illustrates the remaining area of the screen of a display product that is not contained within the two-dimensional detection time window of FIG. 3, according to the present invention.

Timer/logic circuit 64 receives horizontal sync signal 18 and vertical sync signal 20 from signal processing block 16 and sampling signal 62 from sampling circuitry 25. Timer/logic circuit 64 is synchronized to an even field vertical and horizontal sweep by virtue of sync signals 18, 20 and provides a series of one-dimensional time windows, with each window being encapsulated within the timing of a horizontal line as illustrated in FIG. 2. Each series of one-dimensional time windows is comprised of multiple one-dimensional windows and lasts for some number of lines centered in the middle of screen 76 of the display product; for purposes of example, each series is composed of 20 lines. Each series of time windows represents a two-dimensional rectangular area as shown in FIG. 3. In addition, the remaining time of the video field that is not included in this two-dimensional time window is another two-dimensional entity in its own right that is illustrated in FIG. 4. This two-dimensional entity of what is not included represents most of the time of the entire video field in this example.

Figure 7:
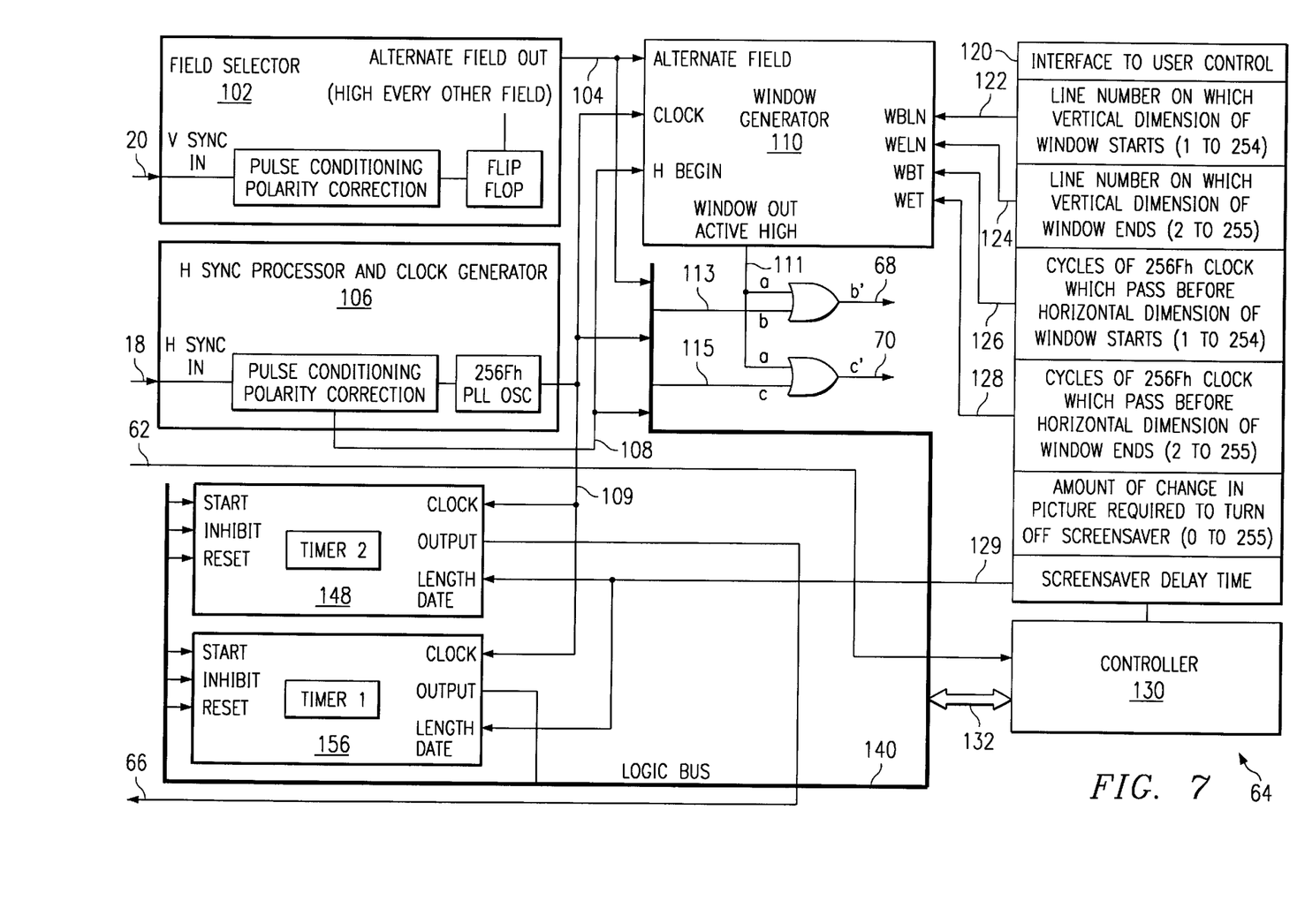
FIG. 7 illustrates an implementation of a timer/logic circuit, according to the present invention.

An embodiment of a general example of implementation of timer/logic circuit 64 is illustrated in FIG. 7. Timer/logic circuit 64 contains the following: field selector 102, horizontal sync processor and clock generator 106, window generator 110, logic gates 114, 116, User Interface 120, controller 130, and timers 148, 156. Horizontal and vertical sync signals 18 and 20, respectively, as well as sampling signal 62 are provided to timer/logic circuit 64 which generates adjustment signal 66 and control signals 68, 70.

Vertical sync signal 20 from signal processing block 16 of FIG. 1 is provided to field selector 102 and passes through a pulse conditioning polarity correction block and a flip flop to produce alternate field signal 104 that is provided to window generator 110 and logic bus 140. Horizontal sync signal 18 from signal processing block 16 is provided to horizontal sync processor and clock generator 106 where it passes through pulse conditional polarity correction and a 256Fh phase locked loop (PLL) oscillator to generate clock signal 109. Clock signal 109 is provided to window generator 110, timer1 156, timer2 148, and logic bus 140. Horizontal sync processor and clock generator 106 additionally generates signal 108 that is provided to window generator 110.

The two-dimensional detection windows of FIGS. 3 and 4 provide an opportunity for each even field, in this example, to sample a block of video in the approximate center of screen (FIG. 3) as well as to sample a NOT a block of video in the center of the screen (FIG. 4). These mutually exclusive two-dimensional detection windows are represented as a logic state of active-high "a" output signal 111 of window generator 110. During the time when the centered block of video shown in FIG. 3 may be sampled "a" output signal 111 goes to a high ("1") logic state; otherwise, signal 112 is a low ("0") logic state.

The user controls a variety of parameters of the screen-saver through appropriate interaction with and manipulation of user interface 120. The timing of the two-dimensional detection window and the screen-saver timeout selection is accomplished through user input and control of user interface 120. The user selects the line number on which the vertical dimension of the two-dimensional detection window begins from lines 1 to 254 of a 255 line window as reflected in window begin line number (WBLN) signal 122, the line number on which the vertical dimension of the two-dimensional detection window ends from lines 2 to 255 of a 255 line window as reflected in widow end line number (WELN) signal 124, the number of cycles of the 256Fh clock 109 which pass before the horizontal dimension of the detection window starts from 1 to 254 lines as reflected in window begin time (WBT), and the number of cycles of the 256Fh clock 109 which pass before the horizontal dimension of the detection window ends from 2 to 255 as reflected in window end time (WET).

In this example, the block of video signal corresponding to a high logic state of "a" signal 111 is chosen to be equal to the period of from 10 to 55 microseconds after the trailing edge of the horizontal sync signal 18 during lines 130 to 150 (the "center" lines) of each even field of a 525 line screen.

In addition to timing of the two-dimensional window, the user controls the amount of change in the picture that is required to turn off the screen-saver function of FIG. 1 and the amount of time, i.e. 10 minutes, for which a static image must be detected before the screen-saver function of FIG. 1 is activated. The wide range of user selection and adjustment with regard to the two-dimensional detection window size and position, the amount of change of the average video levels in the detection window that are required for activation of the video gain reduction of the present invention, the level of contrast reduction and the screen-saver delay time all provide maximum usefulness and flexibility in the practice of the present invention.

It will be understood by those skilled in the art that user interface 120 encompasses both a graphical user interface (GUI) and a menu. The function name, such as "screensaver," of the invention could appear as a menu item among other top-level menu selections. The user could then select "screensaver" and, in the case of a menu, a set of numerical values would appear, with nomenclature, such as "window height, window width, horizontal start position, vertical start position," etc. The user could then use the menu buttons to adjust the values of these parameters in order to obtain the desired detection window size and position. Or, in the case of a GUI, upon the user selecting the "screensaver" menu item, a "default" -sized rectangle of a predetermined size could appear and the user could use the menu buttons to position the rectangle and size it to the user's requirements. This GUI approach would be easier for the user than the menu approach.

At the end of the first time interval, in this example the first ten minute interval, Timer1 156 is reset by signal 154 from logic bus 140. During the next ten minute interval, a high logic state ("1") of "b" signal 113 is provided to logic gate 114 by logic bus 140. The "c" signal 115 is a high logic state ("1") for the duration of every even field when the "b" signal 113 is a high logic state ("1"). The result of this is that during only the first even field occurring after the end of a ten-minute interval, timer1 156 drives "b" signal 113 to a high logic state and during every even field except where "b" signal 113 is a high logic state, "c" signal 115 is a high logic state. This allows the field to be sampled at 10 minute intervals while also having available very recent samples for comparison by sampling circuitry 25 of FIG. 1.

As illustrated in FIG. 7, "b" signal 113 and "c" signal 115 are ANDed with "a" signal 111 to produce "b'" control signal 68 and "c'" control signal 70, according to the following truth tables:

TABLE 1

Truth Table for b' Signal 113

| b' | b = HIGH | b = LOW |
|---|---|---|
| a = HIGH | H | L |
| a = LOW | L | L |

TABLE 2

Truth Table for b' Signal 115

| c' | c = HIGH | c = LOW |
|---|---|---|
| a = HIGH | H | L |
| a = LOW | L | L |

Referring again to FIG. 1, the operation of sampling circuitry 25 will be explained. The operation of electronic switches 28, 30, and 32 is controlled by "b'" and "c'" control signals 68 and 70 to connect A or C output terminal to the input of the appropriate sample and hold sampling circuits 34, 36, 42, 44, 50, and 52. The B output terminal of the electronic switches is terminated. The following truth table illustrates the operation of electronic switches 28, 30, and 32:

TABLE 3

Truth Table for b' Switches

| Input state | Switch output |
|---|---|
| b' = HIGH<br>c' = LOW | A |
| b' = LOW<br>c' = HIGH | C |
| b' = LOW<br>c' = LOW | B |
| b' = HIGH<br>c' = HIGH | B |

Table 3 illustrates that when b' control signal 68 is a high logic state and c' control signal 70 is not, the switch sends its output signal to the A output terminal. Alternately, when c' signal 70 is equal to a high logic state and b' signal 68 is not also a high logic state, the switch sends its output signal to the C output terminal. When both b' signal 68 and c' signal 70 are equal to each other, whether they be a logic high or a logic low state, the output signal is sent to terminated output terminal B.

The result of this sample routing is that a sample of an even field comprising lines 130 to 150 occurring 10 to 55 microseconds after the trailing edge of horizontal sync 18 is available for sampling at ten-minute intervals by sampling circuitry 25. Identically timed samples are available for sampling by the other sampling circuits of sampling circuitry 25 at every even field, other than the particular even field sampled at the ten-minute interval.

Figure 6:
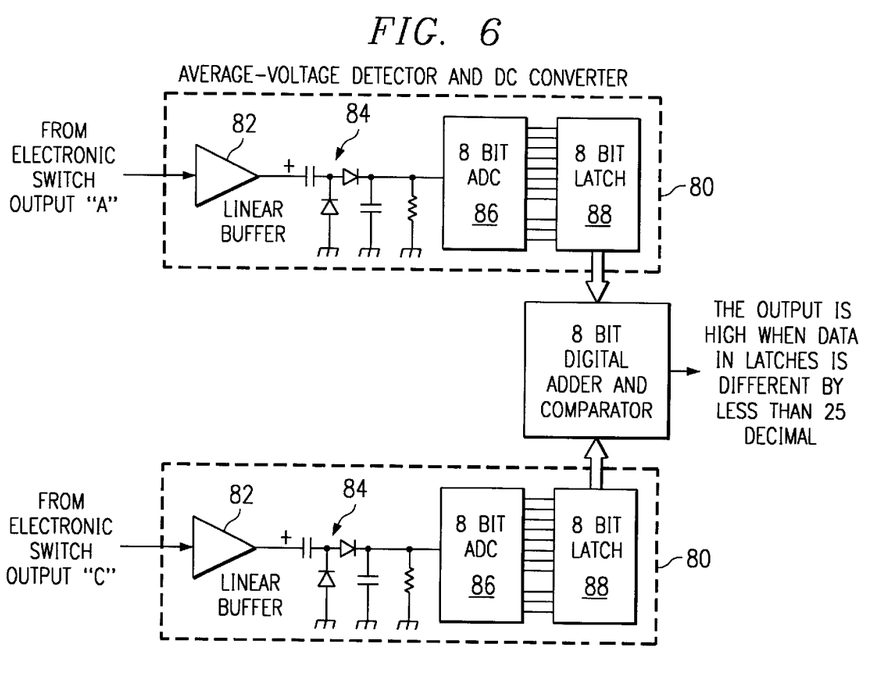
FIG. 6 illustrates an implementation of a sampling circuit, according to the present invention.

An embodiment of sampling circuits 34, 36, 42, 44, 50, and 52 is illustrated within the dashed box 80 of FIG. 6. An analog input buffer 82 receives the video color signal from the appropriate output terminal ("A" or "C") of the preceding switch. An average-voltage detector and DC converter 84 comprised of various capacitive and resistive elements, as shown, averages the signal level over the 20-line duration of the detection window and coverts this measurement into a DC voltage that is passed through an 8-bit analog-to-digital (A/D) converter 86 and then stored in an 8-bit latch 88 or memory. The RC network of average-voltage detector and DC converter 84 has a long discharge time constant in comparison to a 63 microsecond line of video, the length of time of one horizontal line in the NTSC system. According to the example, the latch or memory need only be 1-bit deep and 8-bits wide, in order to provide 256 levels of resolution for the averaged voltage. Additionally, it is noted that rather than sampling and averaging a block of lines, as described above, the sampling circuits could average, digitize and store individual lines or even an entire frame in a larger memory; this would, however, come at the expense of increased system overhead and hardware expense.

When b' control signal 68 goes to a high logic state, the analog signal from the "A" output terminal of the preceding switch is presented to linear buffer 82 and averaged across the RC network of average-voltage detector and DC converter 84. The averaged voltage is converted to 8 bits of parallel data (0 to 255 decimal) and placed in latch 88 or other memory. Likewise, when c' control signal 70 goes to a high logic state, the analog signal from the "C" output terminal of the preceding switch is presented to linear buffer 82 and averaged by element 84. The average voltage is converted from analog to digital 8-bit data and placed in latch 88 or memory.

The comparators 38, 46, and 54 of sampling circuitry 25 compare the data stored in the latches coupled to them. Comparator 38, for instance, will compare the data stored in the latch of sampling circuit 34 to the data stored in the latch of sampling circuit 36 and provide an output signal to controller 130 via logic bus 140, as shown in FIGS. 1 and 7. When the data stored in these two latches differs by less than a predetermined amount determined by the user through user interface 120, such as by less than 25 decimal, or 10%, the comparator outputs a high ("1") logic state representative of a static, unchanging image. The predetermined amount of change can, of course, by set to any value the user prefers through user interface 120.

When the amount of change detected by the comparator is less than the predetermined value, thereby causing the output signal of the comparator to go HIGH, timer2 148 is started by signal 142 provided by logic bus 140 from controller 130. After the time interval of timer2 148, 10 minutes in this example, has elapsed, timer2 148 generates adjustment signal 66 which is received by gain control 72. Adjustment signal 66 operates to reduce the video gain of color signals 21, 22, 23 when the image is static, thereby reducing the contrast of the image displayed on screen 76. The gain reduction effected by gain control 72 occurs only during the active video portion of the video signal so that any automatic bias or gain systems are not affected. Following the contrast reduction of the image, the image is still visible on CRT screen 76 and the image will not be burned into the display product. As soon as activity occurs within the area of the detection window of 10% or more of the image, the output of the comparator goes to a low logic level causing timer2 148 to reset. This turns the hardware-based screen-saver function of the present invention off; adjustment signal 66 produced by timer/logic circuit 64 and provided to gain control 72 causes the full contrast of the image within the detection window to be restored.

Timer2 148 is set to have the same time interval, 10 minutes in this example, as timer1 156. These time intervals, however, are independent of each other in that the start/end of the time interval for one does not trigger the start/end of the time interval for the other timer. For instance, if the output signal of the comparator is a logic low signal, indicative of an adequately changing and therefore non-static image, timer2 148 is reset by signal 146 provided to it by logic bus 140 from controller 130 and it does not start again until the comparator's output goes back to a logic high state. While timer2 148 is in operation after being started in response to a high logic state output signal of the comparator, the state of timer1 156 is locked through signal 152 so that it cannot reset and cause another ten-minute interval sample to be taken. Timer2 148 does not reset its output state until the output of the comparator goes to a low logic state, meaning that the image's content on any one color channel (red, green, or blue) has changed more than the predetermined amount of 10%. Because the output signals 40, 48, and 56 of comparators 38, 46, and 54, respectively, are passed through logic OR element 60, timer2 148 can be reset by the comparator associated with any video channel.

Figure 5:
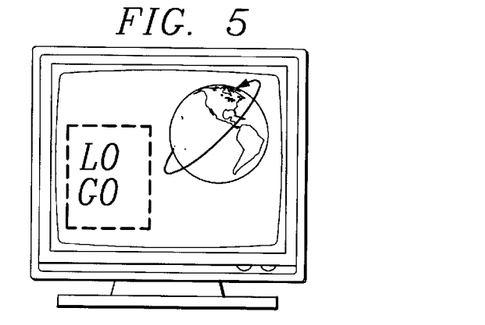
FIG. 5 illustrates a two-dimensional detection time window capable of being selectively sized and positioned, according to the present invention.

It is important to note that the user can easily adjust the size and position of the detection window by means of the user-friendly graphical user interface (GUI) 120 of FIG. 7. This can be a very important feature, particularly where the image being displayed has both static (unchanging) and dynamic (changing) portions. Such is the case in FIG. 5 in which an image has both a logo portion that does not change and a moving portion, in this case a spinning globe, that repetitively changes within the predetermined period of time. By adjusting the size and position of the two-dimensional detection window by appropriate manipulation of user interface 120, the user can select only the static and unchanging portion of the image (the logo) to be within the detection window, indicated by the dashed box formed around the logo portion of the image. Proper placement of the detection window will ensure that the screen-saver circuitry of the present invention will not be thwarted by the spinning globe portion of the image and thus will still operate to reduce the contrast of the logo after the predetermined period of time.

Figure 8:
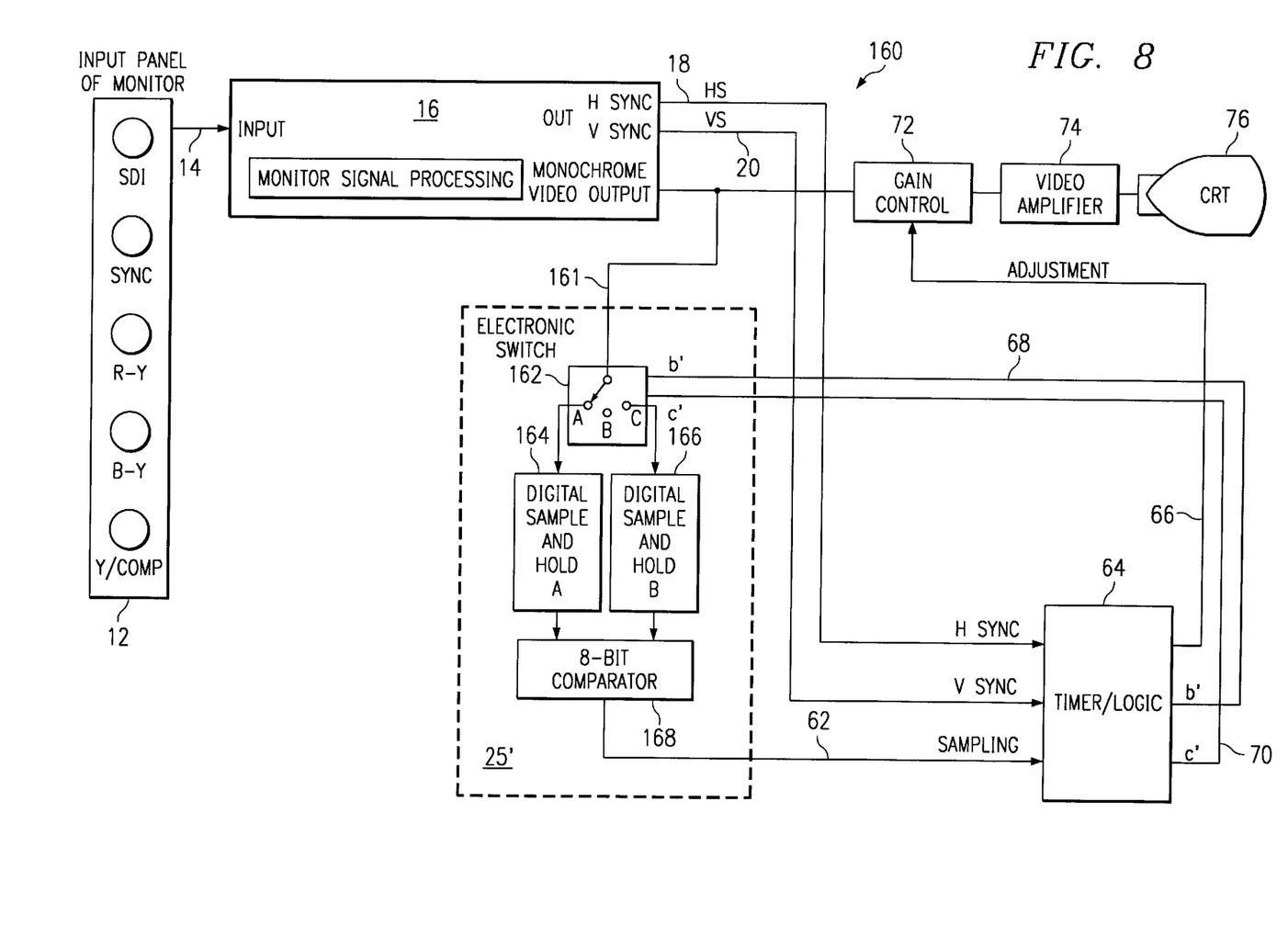
FIG. 8 is a block diagram of a monochromatic CRT analog display product, according to a second embodiment of the present invention.

Referring now to FIG. 8, a block diagram of a monochrome display product 160 that includes a screen-saver to reduce the contrast of a monochromatic image displayed on a screen of the display product in response to a certain portion of the image being static for a predetermined period of time is shown. A monochrome display would benefit in the same manner as a color display and since there is only one signal line (black and white monochrome video signal 161), the circuitry is simpler as can be seen from FIG. 8. Only one channel of video need be monitored, and the OR gate 60 of FIG. 1 has therefore been omitted. In this case, sampling circuitry 25' only has one electronic switch 162, two sampling circuits 164, 166, and one comparator 168. The output of comparator 168 is sampling signal 62 and is provided directly to timer/logic circuit 64 without having to go through logic element 60. Timer/logic circuit 64 is shown in FIG. 7 and generates adjustment signal 66 that is received by gain control 72. Adjustment signal 66 operates to adjust the gain of the monochrome video output signal 161 in a similar manner as described in conjunction with FIG. 1.

In addition to cathode ray tube (CRT) displays of the type illustrated in FIGS. 1 and 8, the present invention may additionally be used with digital displays, such as digital displays of the plasma and liquid crystal display (LCD) types. In the case of a digital display in which the actual panel of the display is driven with data, such as, for example, row, column, and signal information, rather than RGB analog signals, the present invention can be applied. Instead of sampling an analog signal during a sampling window, such as digital display would require applying a checksum algorithm to the data information to obtain a checksum. The checksum is stored in a latch or a larger sized memory if desired or, alternately, the data contents of the sampling window could be stored in a memory for comparison. The location and dimensions of the sampling window for a system using digital signals to drive the optical output device could be defined by row and column addresses, rather than analog timing periods.

Figure 9:
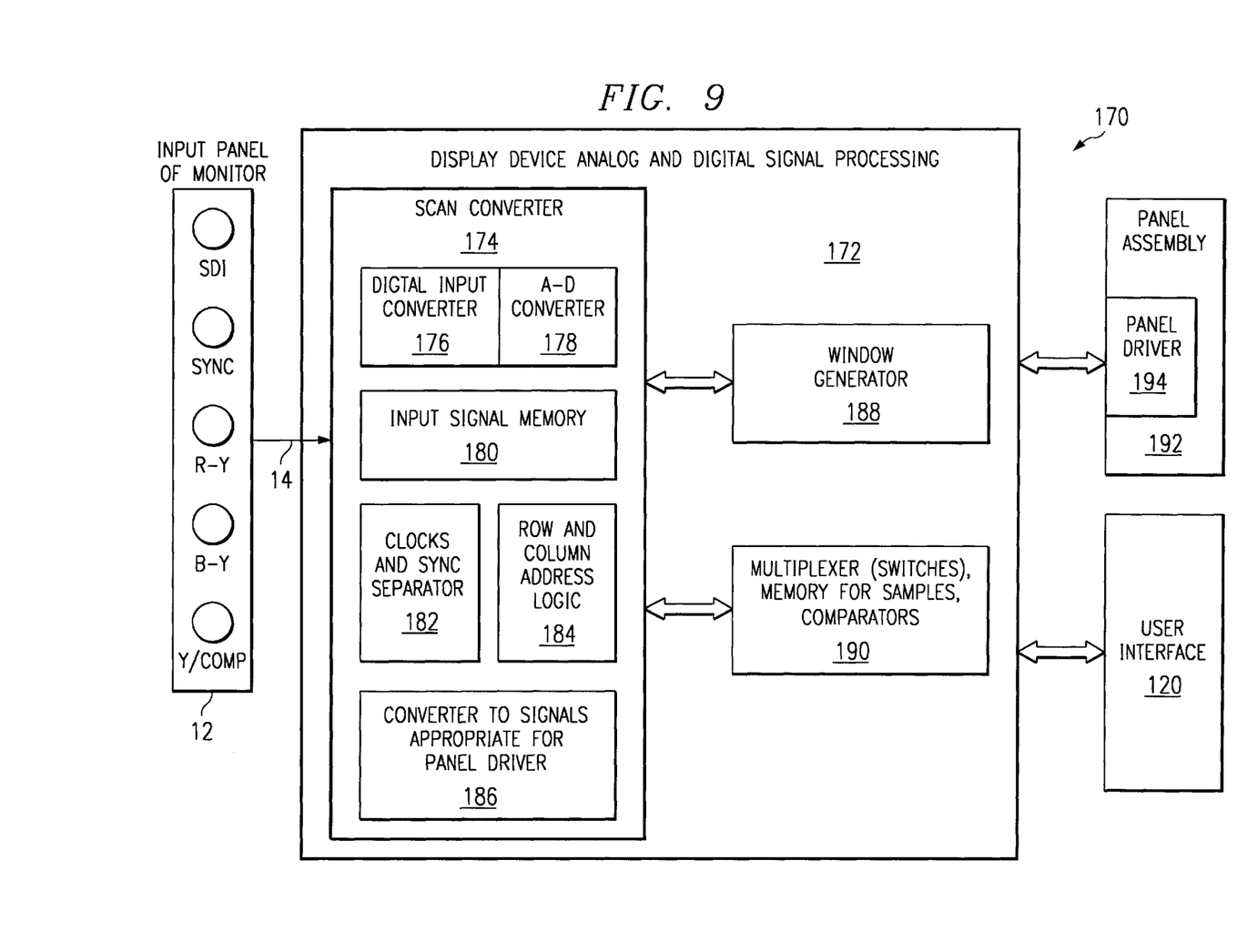
FIG. 9 is a block diagram of a digital display product, according to a third embodiment of the present invention.

Referring to FIG. 9, a block diagram 170 of a digital display product, according to the present invention, is illustrated. As previously mentioned, the digital display product may be a plasma display or an LCD display. The digital display product 192 has a panel driver 194 that receives data, such as row, column and signal information from the display device analog and digital signal processing 172. Processing block 172 contains a scan converter 174, a window generators 188 and circuitry 190.

Video signal 14 is provided to scan converter 174 of processing block 172 from the input panel of the display monitor 12. Scan converter 174 contains digital input converter 176, analog to digital (A-D) converter 178, input signal memory 180, clocks and sync separator 182, row and column address logic 184, and a converter 184 that converts the video signals to an appropriate level for panel driver 194 of the panel assembly. Window generator 188 receives input data from user interface 120 to generate the size and location of the detection window discussed above. Circuitry 190 is similar to sampling circuitry 25 of FIG. 1 and contains multiplexers, such as switches, memory for samples taken of the analog and digital components of the video signal, and comparator circuits. As is well known in the art, the display product has its own built in addressing of the display.

The mechanism of FIG. 9 for reducing the contrast of a static image within a detection window is similar to that discussed above for FIGS. 1–8, with the exception that a checksum algorithm is applied to determine whether the video signal has been static for the predetermined period of time. Panel driver 194 of panel assembly 192 contains a gain control mechanism similar to gain control 72 for reducing the gain and therefore the contrast of a static video signal.

While the invention has been particularly shown and described with reference to a preferred embodiment, it will be understood by those skilled in the art that various changes in form and detail may be made therein without departing from the spirit and scope of the invention. For instance, while the reduction of the contrast of a static image in order to avoid display product burn-in has been discussed, it will be recognized that other characteristics of the image may be altered as well. The brightness of the image could be selectively changed through appropriate manipulation by the user of menu options of user interface 120, for example.

What is claimed is:

1. Circuitry of a display product capable of reducing burn-in of an image into the display product, said circuitry comprising:

a sampling circuit that receives at least one channel signal representative of a video signal supplied to the display product, a first control signal and a second control signal, determines whether a predetermined amount of any of the at least one channel signal has not changed for a predetermined period of time indicative of a static image within a detection window, and generates a sampling signal indicative of whether the predetermined amount of any of the at least one channel signal has not changed for the predetermined period of time;

a timer and logic circuit, receiving the sampling signal and a horizontal sync signal and a vertical sync signal of the video signal, that generates the first control signal, the second control signal, and an adjustment signal capable of reducing the contrast of the static image when the predetermined amount of any of the at least one channel signal within the detection window has not changed for the predetermined period of time; and a gain control element that receives the at least one channel signal and the adjustment signal generated by the timer and logic circuit, changes the gain of the at least one channel signal in accordance with the adjustment signal, and generates at least one gain-modified channel signal, wherein the at least one gain-modified channel signal is received and displayed by a display element of the display product.

2. The circuitry of claim 1, wherein the at least one channel signal comprises first, second, and third channel signals, wherein the sampling circuit determines whether a predetermined amount of any of the first, second, or third channel signals has not changed for the predetermined period of time and the sampling signal is indicative of whether the predetermined amount of any of the first, second, or third channel signals has not changed for the predetermined period, wherein the adjustment signal is capable of reducing the contrast of the static image when the predetermined amount of any of the first, second, or third channel signals within the detection window has not changed for the predetermined period of time; and wherein the gain control element receives the first, second, and third channel signals and the adjustment signal, changes the gain of the first, second, and third channel signals in accordance with the adjustment signal, and generates first, second, and third gain-modified channel signals that are received and displayed by the display element of the display product.

3. The circuitry of claim 2, wherein the first channel signal is a red signal, the second channel signal is a green signal, and the third channel signal is a blue signal.

4. The circuitry of claim 2, wherein said sampling circuit comprises:

a first selection element, having a first output terminal and a second output terminal, that is provided with the first control signal, the second control signal, and the first channel signal;

a first sampling circuit, coupled to the first output terminal of the first selection element, that generates a first sample signal representative of the first channel signal stored in the first sampling circuit at a first time;

a second sampling circuit, coupled to the second output terminal of the first selection element, that generates a second sample signal representative of the first channel signal stored in the second sampling circuit at a second time, wherein the first channel signal is provided to the first sampling circuit through the first output terminal of the first selection element when the first control signal is a first logic state and the second control signal is a second logic state and wherein the first channel signal is provided to the second sampling circuit through the second output terminal of the first selection element when the first control signal is the second logic state and the second control signal is the first logic state;

a first comparison element that compares the first sample signal and the second sample signal and generates an output signal representative of whether the first channel signal stored in the first sampling circuit at the first time differs from the first channel signal stored in the second sampling circuit at the second time by less than the predetermined amount;

a second selection element, having a first output terminal and a second output terminal, that is provided with the first control signal, the second control signal, and the second channel signal;

a third sampling circuit, coupled to the first output terminal of the second selection element, that generates a third sample signal representative of the second channel signal stored in the third sampling circuit at the first time;

a fourth sampling circuit, coupled to the second output terminal of the second selection element, that generates a fourth sample signal representative of the second channel signal stored in the fourth sampling circuit at the second time, wherein the second channel signal is provided to the third sampling circuit through the first output terminal of the second selection element when the first control signal is the first logic state and the second control signal is the second logic state and wherein the second channel signal is provided to the fourth sampling circuit through the second output terminal of the second selection element when the first control signal is the second logic state and the second control signal is the first logic state;

a second comparison element that compares the third sample signal and the fourth sample signal and generates an output signal representative of whether the second channel signal stored in the third sampling circuit at the first time differs from the second channel signal stored in the fourth sampling circuit at the second time by less than the predetermined amount;

a third selection element, having a first output terminal and a second output terminal, that is provided with the first control signal, the second control signal, and the third channel signal;

a fifth sampling circuit, coupled to the first output terminal of the third selection element, that generates a fifth sample signal representative of the third channel signal stored in the fifth sampling circuit at the first time;

a sixth sampling circuit, coupled to the second output terminal of the third selection element, that generates a sixth sample signal representative of the third channel signal stored in the sixth sampling circuit at the second time, wherein the third channel signal is provided to the fifth sampling circuit through the first output terminal of the third selection element when the first control signal is the first logic state and the second control signal is the second logic state and wherein the third channel signal is provided to the sixth sampling circuit through the second output terminal of the third selection element when the first control signal is the second logic state and the second control signal is the first logic state;

a third comparison element that compares the fifth sample signal and the sixth sample signal and generates an output signal representative of whether the third channel signal stored in the fifth sampling circuit at the first time differs from the third channel signal stored in the sixth sampling circuit at the second time by less than the predetermined amount; and a gating logic element that is provided with the output signal of the first comparison element, the output signal of the second comparison element, and the output signal of the third comparison element and generates the sampling signal indicative of whether the predetermined amount of any of the first, second, or third channel signals has not changed for the predetermined period of time.

5. The circuitry of claim 4, wherein the output signal of the first comparison element is the first logic state when the first channel signal stored in the first sampling circuit at the first time differs from the first channel signal stored in the second sampling circuit at the second time by less than the predetermined amount, the output signal of the second comparison element is the first logic state when the second channel signal stored in the third sampling circuit at the first time differs from the second channel signal stored in the fourth sampling circuit at the second time by less than the predetermined amount, and the output signal of the third comparison element is the first logic state when the third channel signal stored in the fifth sampling circuit at the first time differs from the third channel signal stored in the sixth sampling circuit at the second time by less than the predetermined amount.

6. The circuitry of claim 4, wherein the first, second and third selection elements are switches.

7. The circuitry of claim 2, wherein said timer and logic circuitry comprises:

a field selector provided with the vertical sync signal that generates an alternate field signal;

a clock generator provided with the horizontal sync signal that generates a clock signal;

a detection window generator that receives the alternate field signal, the clock signal, and a plurality of detection window control signals and generates a detection window control signal;

a controller;

a first timer element that receives a time signal representative of the predetermined period of time and generates an output signal that is received by the controller;

a second timer element that receives the time signal and generates the adjustment signal;

a logic element that receives the detection window control signal, a third control signal, and a fourth control signal, gates the detection window control signal and the third control signal to generate the first control signal, and gates the detection window control signal and the fourth control signal to generate the second control signal; and a user interface coupled to the controller through which the predetermined amount of change of the image, the predetermined period of time, and the detection window are set that generates the plurality of detection window control signals and the time signal, wherein after the end of a first time interval defined by the predetermined period of time the controller resets the first timer element, during a first field after the end of the first time interval the controller drives the third control signal to the first logic state and the fourth control signal to the second logic state, and after the first field the controller drives the fourth control signal to the first logic state if the third control signal is not the first logic state.

8. The circuitry claim 7, wherein the clock generator further generates a polarity correction signal that is received by the detection window generator and the controller.

9. The circuitry of claim 2, wherein said sampling circuit comprises:

a first selection element, having a first output terminal and a second output terminal, that is provided with the first control signal, the second control signal, and the first channel signal;

a first sampling circuit, coupled to the first output terminal of the first selection element, that generates a first sample signal representative of the first channel signal stored in the first sampling circuit at a first time;

a second sampling circuit, coupled to the second output terminal of the first selection element, that generates a second sample signal representative of the first channel signal stored in the second sampling circuit at a second time, wherein the first channel signal is provided to the first sampling circuit through the first output terminal of the first selection element when the first control signal is a first logic state and the second control signal is a second logic state and wherein the first channel signal is provided to the second sampling circuit through the second output terminal of the first selection element when the first control signal is the second logic state and the second control signal is the first logic state;

a first comparison element that compares the first sample signal and the second sample signal and generates an output signal representative of whether the first channel signal stored in the first sampling circuit at the first time differs from the first channel signal stored in the second sampling circuit at the second time by less than the predetermined amount;

a second selection element, having a first output terminal and a second output terminal, that is provided with the first control signal, the second control signal, and the second channel signal;

a third sampling circuit, coupled to the first output terminal of the second selection element, that generates a third sample signal representative of the second channel signal stored in the third sampling circuit at the first time;

a fourth sampling circuit, coupled to the second output terminal of the second selection element, that generates a fourth sample signal representative of the second channel signal stored in the fourth sampling circuit at the second time, wherein the second channel signal is provided to the third sampling circuit through the first output terminal of the second selection element when the first control signal is the first logic state and the second control signal is the second logic state and wherein the second channel signal is provided to the fourth sampling circuit through the second output terminal of the second selection element when the first control signal is the second logic state and the second control signal is the first logic state;

a second comparison element that compares the third sample signal and the fourth sample signal and generates an output signal representative of whether the second channel signal stored in the third sampling circuit at the first time differs from the second channel signal stored in the fourth sampling circuit at the second time by less than the predetermined amount;

a third selection element, having a first output terminal and a second output terminal, that is provided with the first control signal, the second control signal, and the third channel signal;

a fifth sampling circuit, coupled to the first output terminal of the third selection element, that generates a fifth sample signal representative of the third channel signal stored in the fifth sampling circuit at the first time;

a sixth sampling circuit, coupled to the second output terminal of the third selection element, that generates a sixth sample signal representative of the third channel signal stored in the sixth sampling circuit at the second time, wherein the third channel signal is provided to the fifth sampling circuit through the first output terminal of the third selection element when the first control signal is the first logic state and the second control signal is the second logic state and wherein the third channel signal is provided to the sixth sampling circuit through the second output terminal of the third selection element when the first control signal is the second logic state and the second control signal is the first logic state;

a third comparison element that compares the fifth sample signal and the sixth sample signal and generates an output signal representative of whether the third channel signal stored in the fifth sampling circuit at the first time differs from the third channel signal stored in the sixth sampling circuit at the second time by less than the predetermined amount; and a gating logic element that is provided with the output signal of the first comparison element, the output signal of the second comparison element, and the output signal of the third comparison element and generates the sampling signal indicative of whether the predetermined amount of any of the first, second, or third channel signals has not changed for the predetermined period of time;

and wherein said timer and logic circuitry comprises:
   a field selector provided with the vertical sync signal that generates an alternate field signal;
   a clock generator provided with the horizontal sync signal that generates a clock signal;
wherein the clock generator further generates a polarity correction signal that is received by the detection window generator and the controller;
a detection window generator that receives the alternate field signal, the clock signal, and a plurality of detection window control signals and generates a detection window control signal;
a controller;
a first timer element that receives a time signal representative of the predetermined period of time and generates an output signal that is received by the controller;
a second timer element that receives the time signal and generates the adjustment signal;
a logic element that receives the detection window control signal, a third control signal, and a fourth control signal, gates the detection window control signal and the third control signal to generate the first control signal, and gates the detection window control signal and the fourth control signal to generate the second control signal; and
a user interface coupled to the controller through which the predetermined amount of change of the image, the predetermined period of time, and the detection window are set that generates the plurality of detection window control signals and the time signal,
wherein after the end of a first time interval defined by the predetermined period of time the controller resets the first timer element, during a first field after the end of the first time interval the controller drives the third control signal to the first logic state and the fourth control signal to the second logic state, and after the first field the controller drives the fourth control signal to the first logic state if the third control signal is not the first logic state.

10. The circuitry of claim 9, wherein the output signal of the first comparison element is the first logic state when the first channel signal stored in the first sampling circuit at the first time differs from the first channel signal stored in the second sampling circuit at the second time by less than the predetermined amount, the output signal of the second comparison element is the first logic state when the second channel signal stored in the third sampling circuit at the first time differs from the second channel signal stored in the fourth sampling circuit at the second time by less than the predetermined amount, and the output signal of the third comparison element is the first logic state when the third channel signal stored in the fifth sampling circuit at the first time differs from the third channel signal stored in the sixth sampling circuit at the second time by less than the predetermined amount.

11. The circuitry of claim 9, wherein the first, second and third selection elements are switches.

12. The circuitry of claim 9, wherein the clock generator further generates a polarity correction signal that is received by the detection window generator and the controller.

13. The circuitry of claim 1, wherein the video signal is a monochromatic video signal and the at least one channel signal is a monochromatic channel signal.

14. The circuitry of claim 13, wherein said sampling circuit comprises:
   a selection element, having a first output terminal and a second output terminal, that is provided with the first control signal, the second control signal, and the monochromatic channel signal;
   a first sampling circuit, coupled to the first output terminal of the selection element, that generates a first sample signal representative of the monochromatic channel signal stored in the first sampling circuit at a first time;
   a second sampling circuit, coupled to the second output terminal of the selection element, that generates a second sample signal representative of the monochromatic channel signal stored in the second sampling circuit at a second time, wherein the monochromatic channel signal is provided to the first sampling circuit through the first output terminal of the first selection element when the first control signal is a first logic state and the second control signal is a second logic state and wherein the monochromatic channel signal is provided to the second sampling circuit through the second output terminal of the first selection element when the first control signal is the second logic state and the second control signal is the first logic state; and
   a comparison element that compares the first sample signal and the second sample signal and generates an output signal representative of whether the monochromatic channel signal stored in the first sampling circuit at the first time differs from the monochromatic channel signal stored in the second sampling circuit at the second time by less than the predetermined amount.

15. The circuitry of claim 14, wherein the selection element is a switch.

16. The circuitry of claim 13, wherein said timer and logic circuitry comprises:
   a field selector provided with the vertical sync signal that generates an alternate field signal;
   a clock generator provided with the horizontal sync signal that generates a clock signal;
   a detection window generator that receives the alternate field signal, the clock signal, and a plurality of detection window control signals and generates a detection window control signal;
   a controller;
   a first timer element that receives a time signal representative of the predetermined period of time and generates an output signal that is received by the controller;
   a second timer element that receives the time signal and generates the adjustment signal;

a logic element that receives the detection window control signal, a third control signal, and a fourth control signal, gates the detection window control signal and the third control signal to generate the first control signal, and gates the detection window control signal and the fourth control signal to generate the second control signal; and a user interface coupled to the controller through which the predetermined amount of change of the image, the predetermined period of time, and the detection window are set that generates the plurality of detection window control signals and the time signal, wherein after the end of a first time interval defined by the predetermined period of time the controller resets the first timer element, during a first field after the end of the first time interval the controller drives the third control signal to the first logic state and the fourth control signal to the second logic state, and after the first field the controller drives the fourth control signal to the first logic state if the third control signal is not the first logic state.

17. The circuitry of claim 16, wherein the clock generator further generates a polarity correction signal that is received by the detection window generator and the controller.

18. The circuitry of claim 13, wherein said sampling circuit comprises:

a selection element, having a first output terminal and a second output terminal, that is provided with the first control signal, the second control signal, and the monochromatic channel signal;

a first sampling circuit, coupled to the first output terminal of the selection element, that generates a first sample signal representative of the monochromatic channel signal stored in the first sampling circuit at a first time;

a second sampling circuit, coupled to the second output terminal of the selection element, that generates a second sample signal representative of the monochromatic channel signal stored in the second sampling circuit at a second time, wherein the monochromatic channel signal is provided to the first sampling circuit through the first output terminal of the first selection element when the first control signal is a first logic state and the second control signal is a second logic state and wherein the monochromatic channel signal is provided to the second sampling circuit through the second output terminal of the first selection element when the first control signal is the second logic state and the second control signal is the first logic state; and a comparison element that compares the first sample signal and the second sample signal and generates an output signal representative of whether the monochromatic channel signal stored in the first sampling circuit at the first time differs from the monochromatic channel signal stored in the second sampling circuit at the second time by less than the predetermined amount;

and wherein said timer and logic circuitry comprises:

a field selector provided with the vertical sync signal that generates an alternate field signal;

a clock generator provided with the horizontal sync signal that generates a clock signal;

wherein the clock generator further generates a polarity correction signal that is received by the detection window generator and the controller;

a detection window generator that receives the alternate field signal, the clock signal, and a plurality of detection window control signals and generates a detection window control signal;

a controller;

a first timer element that receives a time signal representative of the predetermined period of time and generates an output signal that is received by the controller;

a second timer element that receives the time signal and generates the adjustment signal;

a logic element that receives the detection window control signal, a third control signal, and a fourth control signal, gates the detection window control signal and the third control signal to generate the first control signal, and gates the detection window control signal and the fourth control signal to generate the second control signal; and a user interface coupled to the controller through which the predetermined amount of change of the image, the predetermined period of time, and the detection window are set that generates the plurality of detection window control signals and the time signal, wherein after the end of a first time interval defined by the predetermined period of time the controller resets the first timer element, during a first field after the end of the first time interval the controller drives the third control signal to the first logic state and the fourth control signal to the second logic state, and after the first field the controller drives the fourth control signal to the first logic state if the third control signal is not the first logic state.

19. The circuitry of claim 18, wherein the selection element is a switch.

20. The circuitry of claim 18, wherein the clock generator further generates a polarity correction signal that is received by the detection window generator and the controller.

21. A display product capable of detecting an image being displayed on the display product and reducing burn-in of the image into the display product, said display product comprising:

a signal processing element that receives a video signal provided to the display product and processes the video signal to generate at least one channel signal representative of the video signal, a horizontal sync signal, and a vertical sync signal;

a sampling circuit that receives the at least one channel signal, a first control signal and a second control signal, determines whether a predetermined amount of any of the at least one channel signal has not changed for a predetermined period of time indicative of a static image within a detection window, and generates a sampling signal indicative of whether the predetermined amount of any of the at least one channel signal has not changed for the predetermined period of time;

a timer and logic circuit, receiving the sampling signal and a horizontal sync signal and a vertical sync signal of the video signal, that generates the first control signal, the second control signal, and an adjustment signal capable of reducing the contrast of the static image when the predetermined amount of any of the at least one channel signal within the detection window has not changed for the predetermined period of time;

a gain control element that receives the at least one channel signal and the adjustment signal generated by the timer and logic circuit, changes the gain of the at least one channel signal in accordance with the adjustment signal, and generates at least one gain-modified channel signal, wherein the at least one gain-modified channel signal is received and displayed by a display element of the display product;

an amplifier coupled to the gain control element that receives and amplifies the at least one gain-modified channel signal from the gain control element to produce at least one amplified channel signal; and a display element that receives the at least one amplified channel signal and displays the image according to the at least one amplified channel signal.

22. The display product of claim 21, wherein the display element is a cathode ray tube.

23. A digital display product capable of reducing burn-in of a static image being displayed on the digital display product, said digital display product comprising:

a processing circuit that receives a video signal supplied to the digital display product and processes the video signal to generate a first checksum representative of the video signal at a first time and store the first checksum in a memory device of the processing circuit, generate a second checksum representative of the video signal at a second time, compare the first checksum to the second checksum to determine whether the video signal has not changed for a predetermined period of time indicative of a static image of the video signal displayed within a detection window, and generate a comparison signal indicative of whether the video signal has not changed for the predetermined period of time, wherein the predetermined period of time is defined as the time that has elapsed from the first time to the second time; and a panel assembly of the digital display product having a panel driver that receives the comparison signal generated by the processing circuit and reduces the contrast of the static image displayed when the comparison signal indicates that the video signal within the detection window has not changed for the predetermined period of time.

24. The display product of claim 23, wherein the digital display element is a plasma display panel.

25. The display product of claim 23, wherein the digital display element is a liquid crystal display (LCD).

26. A method for adjusting the contrast of an image displayed on a display product in order to reduce burn-in of the image into a screen of the display product, said method comprising:

defining a size and a position of a detection window of the image displayed on the display product;

detecting when a predetermined amount of the image within a detection window has not changed for a predetermined period of time representative of the image being a static image within the detection window; and in response to the image within the detection window being a static image, reducing the contrast of the image in its entirety.

27. The method of claim 26, wherein defining the size and the position of the detection window is accomplished through manipulation of a user interface of the display product.

28. The method of claim 26, wherein reducing the contrast of the image in its entirety is accomplished by reducing a video gain of the image.

29. The method of claim 26, wherein the predetermined amount of the image within the detection window is expected to become static or is static.

* * * * *